United States Patent [19]

Adelsen et al.

[11] Patent Number: 4,523,220

[45] Date of Patent: Jun. 11, 1985

[54] COMPATIBLE HIGH-DEFINITION TELEVISION SYSTEM UTILIZING HADAMARD BASIS FUNCTIONS

[75] Inventors: Edward H. Adelsen, Plainsboro; Charles B. Oakley, Princeton, both of N.J.

[73] Assignee: RCA Corporation, Princeton, N.J.

[21] Appl. No.: 459,334

[22] Filed: Jan. 19, 1983

[51] Int. Cl.³ .......................... H04N 5/38; H04N 5/46
[52] U.S. Cl. ....................................... 358/12; 358/13; 358/141
[58] Field of Search ................. 358/11, 12, 13, 16, 358/133, 136, 140, 141

[56] References Cited

U.S. PATENT DOCUMENTS

| 3,976,826 | 8/1976 | Fullton, Jr. | 358/133 |
|---|---|---|---|
| 3,984,626 | 10/1976 | Mounts | 358/133 |
| 4,210,931 | 7/1980 | Bailey et al. | 358/128.5 |
| 4,281,344 | 7/1981 | Mounts | 358/136 |
| 4,323,916 | 4/1982 | Dischert et al. | 358/13 |
| 4,352,122 | 9/1982 | Reitmeier | 358/11 |
| 4,449,143 | 5/1984 | Dischert | 358/11 |

FOREIGN PATENT DOCUMENTS 3023636 8/1981 Fed. Rep. of Germany.

OTHER PUBLICATIONS

U.S. patent application No. 288,753, (Dischert et al.), filed Jul. 31, 1981.
U.S. patent application No. 352,001, (Hurst), filed Feb. 24, 1982.
U.S. patent application No. 424,232, (Powers), filed Sep. 27, 1982.
Digital Image Processing, Chapter 3.5.3 Hadamard Transform, (pp. 96-103), 1977, (Gonzalez).
Digital Image Processing, Chapter 6.4.2.7 Adaptive Transform Encoding, (pp. 300-301), 1977, (Gonzalez).

Primary Examiner—Michael A. Masinick
Attorney, Agent, or Firm—P. J. Rasmussen; P. M. Emanuel; R. G. Coalter

[57] ABSTRACT

A compatible high-definition television system may be achieved by dividing a standard picture element into four arranged sub-picture elements arranged in a parallelo-grammatic fashion. In the system a sum signal which is the sum of the four sub-picture elements is transmitted as a standard luminance signal. Further, the system includes means for computing three difference signals and transmitting these in separate channels. The first difference signal is the horizontal difference signal, the second is a vertical difference signal and the third is the diagonal difference signal. These four signals are an orthogonal set of 2×2 Hadamard basis functions. To reconstruct the high-definition television sub-picture element values, the three difference signals and the sum signal are summed to determine the orthogonal sub-pixel values. The system uses simple hardware and does not require a frame buffer.

19 Claims, 15 Drawing Figures

COMPATIBLE HIGH-DEFINITION TELEVISION SYSTEM UTILIZING HADAMARD BASIS FUNCTIONS

This invention relates to a high-definition television (HDTV) system having increased resolution and, more particularly, to a system that is compatible with major standef (standard definition) television standards and viewable on standef receivers.

BACKGROUND OF THE INVENTION

Standard NTSC television scans 525 lines per frame in the form of two sequential fields of 262½ lines each. The lines of each field interlace with the lines of adjacent fields and the eye of a viewer integrates these interlaced lines to reduce the effect of 30 Hz frame-rate flicker. However, the line structure is still visible under certain circumstances, and is particularly visible on large-screen television displays viewed from a relatively close distance. The problem is made even more severe by the ultra-large pictures formed by projection-type television displays. The advantages of such ultra-large pictures in providing the illusion of surrounding the viewer are reduced by the need for the viewer to remain sufficiently far from the display so that the line structure is not so visible.

A compatible high-definition television system is described in U.S. patent application Ser. No. 288,753 filed July 31, 1981, in the name of C. B. Oakley et al. which issued Jan. 31, 1984 as U.S. Pat. No. 4,429,327. In this system, the visibility of the line structure is reduced in a manner compatible with standef NTSC (or PAL) television by using a camera which generates two lines for every standard line (for example, 1,050 lines-per-frame rather than 525), forming separate signals related to the sums and differences of pixels on adjacent raster lines, and transmitting as a compatible signal the sum signal, together with the difference signal, which may be transmitted separately or concealed within a composite color signal. This arrangement increases the vertical resolution, by increasing the number of lines, which makes it possible to view an ultra-large picture from a closer distance without discerning the line structure. With this system, the vertical luminance and chrominance resolution becomes about 1,000 lines, while the horizontal resolution, which is established by the luminance bandwidth, remains at about 240 television lines. The horizontal resolution thus becomes the limiting factor in the distance between the viewer and an ultra-large display, once the vertical line structure becomes invisibile.

Other compatible high-definition television systems are described in U.S. patent application Ser. Nos. 352,001 and 424,232, filed Feb. 24, 1982, and Sept. 27, 1982, in the names of R. N. Hurst and K. H. Powers, respectively. In these systems the scanning spot in the camera is wobbled in a zigzag pattern to double the resolution in both the horizontal and vertical directions of the high-definition display. The wider bandwidth signal which is transmitted is compatible with standef television receivers; the effect of the narrow bandwidth of such receivers is to average adjacent pixels in both horizontal and vertical directions. In the high-definition wider bandwidth television receiver, the scanning spot is synchronized to wobble in accordance with the wobble that was introduced by the camera or, in one embodiment, to progressively scan. A disadvantage of spot wobbling is that certain scanning artifacts on the television display may become visible. In these systems the scanning line structure may display a visible high-frequency modulation of the space between adjacent lines of the same field which will appear to move in a way that may be objectionable to the viewer.

SUMMARY OF THE INVENTION

It is very desirable to permit transmission of television signals compatible with standard definition receivers so that the performance of existing receivers would not be seriously degraded and at the same time to transmit a high-definition signal which is either included in a standef composite signal in some interval which contains little or no information or transmitted on a separate channel or channels. In accordance with the principles of the present invention a high-definition television system is provided which overcomes the disadvantages of the prior art.

In accordance with one aspect of the present invention a high-definition television system is provided which is compatible with a standard-definition receiver having capability of operating in response to a limited bandwidth signal. The system includes scanning means for scanning an image and quantizing means for time-quantizing samples of the image. Further, the system includes means for transforming at least three of the time-quantized samples formed in a rectangular array into a plurality of coefficients representative of the coefficients of Hadamard basis functions. In this system, one of the plurality of coefficients is the sum of the samples formed in the rectangular array and representative of a picture element of a standard-definition receiver and therefore compatible therewith.

DESCRIPTION OF THE PREFERRED EMBODIMENTS

Figure 1:
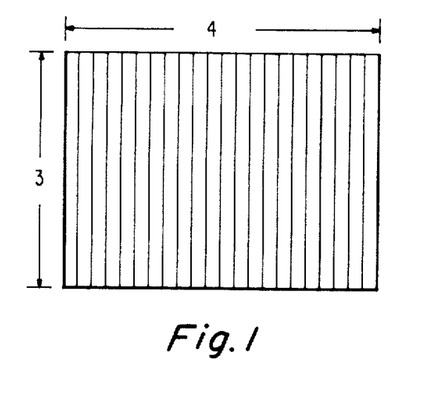
FIGS. 1 and 2 illustrate vertical and horizontal lines on a raster, respectively.

FIG. 1 illustrates a raster having an aspect ratio with a height of 3 units and a width of 4 units. The raster is scanned in the usual fashion by successive horizontal lines (not shown). Alternate light and dark vertical lines are displayed on the raster. The light and dark lines are related to the frequency of the signal being processed. The horizontal scanning time in NTSC is 63.5 microseconds of which approximately 10 microseconds is used for horizontal retrace and blanking, leaving approximately 53 microseconds as the duration of the active line scan. The alternate light and dark lines formed on the raster in FIG. 1 require positive-and negative-going signal excursions, the rate of which is determined by the number and relative physical spacing of the lines of the object to be televised. The luminance bandwidth of the television signal is effectively about 4 MHz as practiced in standef receivers, and thus the highest-frequency signal which can pass through the channel can go through a full cycle (one positive and one negative excursion of the luminance) in one-fourth microsecond. In the 53 microseconds (the duration of the active portion of one horizontal line) approximately 220 complete cycles can take place. Thus, 220 black and 220 white lines can occur in one horizontal line, for a total of 440 television lines in a complete horizontal scan. However, in accordance with standard television practice, the horizontal resolution must be multiplied by $\frac{3}{4}$ in order to determine the standard resolution (the resolution which would occur if the raster were square and had a width equal to the height). Thus, the horizontal resolution is about 330 television lines for a 4 MHz bandwidth, or approximately 80 television lines per Megahertz. Using this criterion, the resolution in the horizontal direction for a color signal component having a 1.5 MHz bandwidth is about 120 television lines. The eye of a viewer is much more sensitive to luminance variations than color variations, however, so that a picture having 120 lines of horizontal resolution in color and 330 lines in luminance will be perceived as having 330 line overall resolution.

Figure 2:
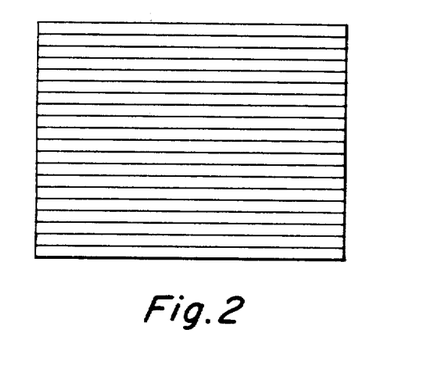

In the vertical direction, each field consists of more than 250 scanned lines as symbolically shown in FIG. 2. The color resolution in the vertical direction is much better than in the horizontal direction because the horizontal resolution is limited by the chroma-channel bandwidth as mentioned above to about 120 television lines, whereas the vertical color resolution is not determined by the channel bandwidth but rather by the number of horizontal lines by which the picture is sampled in the vertical direction. Consequently, the color resolution in the vertical direction exceeds the color resolution in the horizontal direction. The horizontal luminance resolution is generally considered to be inadequate and, as mentioned previously, the vertical luminance resolution is not adequate because the line structure can be seen in large picture displays.

Figure 3:
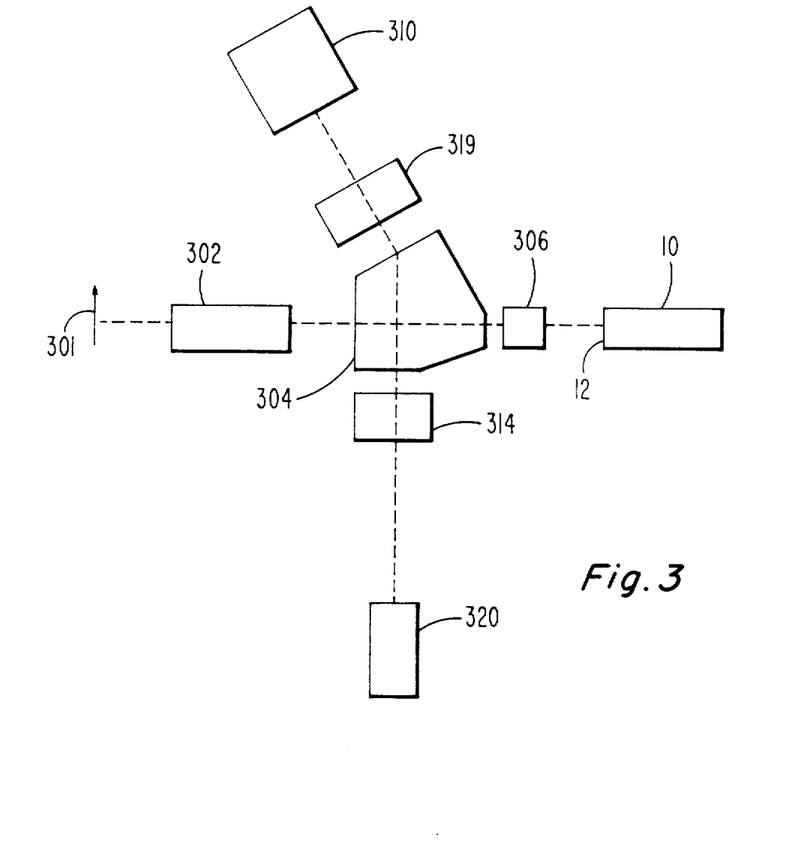
FIG. 3 illustrates the optical portions of a color camera.

FIG. 3 illustrates the optical portions of the high-resolution camera according to one aspect of the invention. In FIG. 3, light from a scene illustrated as an arrow 301 passes through an optical system illustrated by block 302 and into a color-splitting prism 304. Green (G) light passes as is known through further optics 306 as required for focusing onto the photosensitive element or faceplate 12 of a camera tube 10 (e.g., vidicon). The red (R) components of the light from the scene are separated by prism 304 and are focused by optics 319 onto the photosensitive element of vidicon 310. The blue (B) is similarly separated by prism 304 and focused by optics 314 onto the photosensitive element of vidicon 320. Vidicons 10, 310 and 320 may be of the diode-gun impregnated-cathode (DIS) saticon type or other type capable of resolution in excess of 1,000 lines both horizontally and vertically. The vidicons are registered as required to superpose the R, G and B rasters which they produce.

Figure 4:
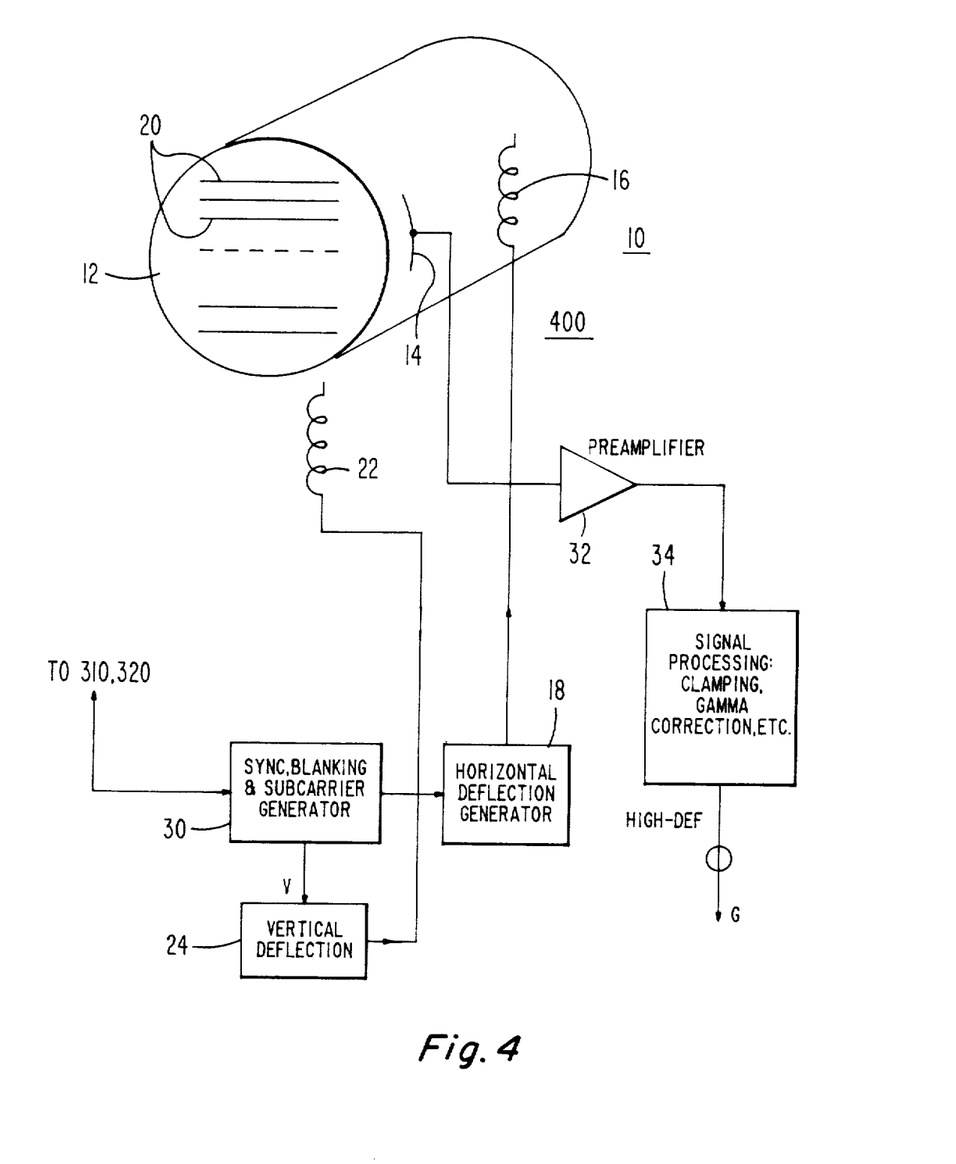
FIG. 4 illustrates camera vidicon and circuit arrangements, partially in block diagram form, according to the invention.

FIG. 4 illustrates in simplified form a high-resolution vidicon 10 and its associated circuitry. In the FIGURES elements designated with like numerals are the same or similar items in the various figures. Vidicon 10 includes a faceplate 12 which includes on the back portion thereof a photosensitive target element coupled to a target electrode 114. An electron beam (not shown) which is deflected horizontally by magnetic fields associated with a horizontal deflection winding illustrated as 16 driven by a horizontal deflection generator 18 scans horizontally across faceplate 12 to produce horizontal scan lines illustrated as 20. The scanning electron beam is deflected in the vertical direction by a magnetic field associated with a vertical deflection winding 22 driven by a vertical deflection generator 24. A synchronizing signal, blanking signal and subcarrier signal are generated in generator 30 by which horizontal deflection generator 18 and vertical deflection generator 24 are synchronized. The synchronizing, blanking and subcarrier signals are also applied to synchronization signal generators associated with vidicons 310 and 320. The scanning of the electron beam across faceplate 12 upon which the image is focused creates a signal at target electrode 14 in known fashion. The signal is representative of the brightness of the image. The image representative signal from target 14 is applied to a preamplifier 32 and to signal processing circuits such as black level clamping, gamma correction and so forth illustrated together as block 34.

Figure 5:
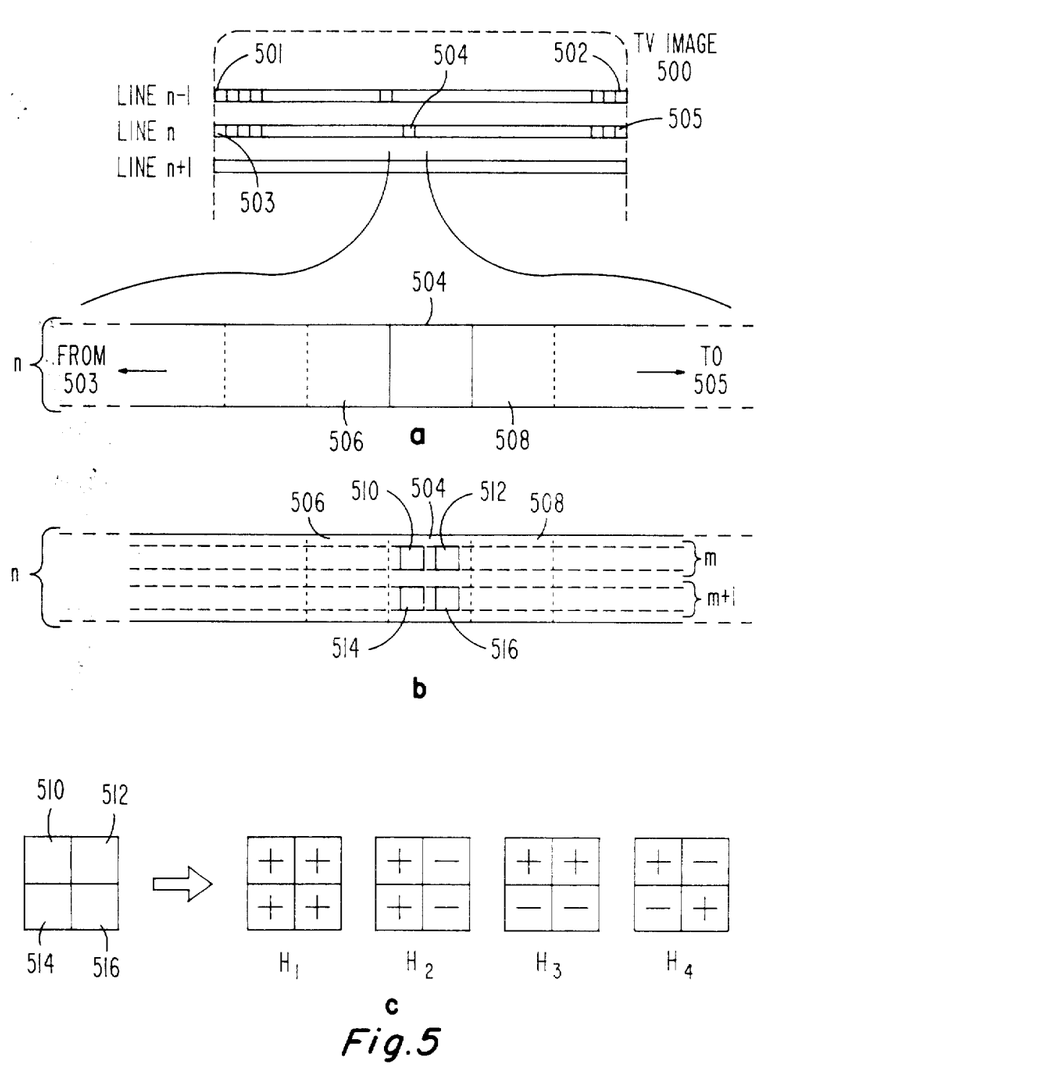
FIG. 5 illustrates in detail the nature of the scanning pattern of the camera of FIG. 4 or of a high resolution kinescope, according to an aspect of the invention.

FIG. 5 illustrates a television raster or image, designated generally as 500, together with 3 scan lines n−1, n and n+1 arbitrarily chosen from among the many scan lines making up the raster. Each scan line is made up of a large number of picture elements, or pixels, the size of which is determined by the resolution capability of the television system. For a standard definition NTSC television system, the number of picture samples needed in each line is about 700. The first pixel of line n−1 is designated 501 and the last pixel as 502. In the NTSC television system, lines n−1, n and n+1 are laid down sequentially during one television field and, therefore, are separated by a sufficient distance to accommodate the interlaced lines of a second field forming a television frame. In FIG. 5a the region about an arbitrarily chosen pixel 504 of line n has been expanded as an aid to understanding the invention. Those skilled in the art will understand that the square shape of the pixels is only illustrative. FIG. 5b illustrates a portion of a raster pattern of a DIS high resolution saticon expanded as in FIG. 5a. Because of the high resolution of the saticon, the pixels are smaller so that four adjacent pixels illustrated as 510, 512, 514, 516 fit within the same space occupied by a single pixel in a standef scan. These four adjacent pixels are, illustratively, arranged in a rectangular array. Pixels 510 and 512 may be considered to be portions of a subraster line m while pixels 514 and 516 may be considered to be pixels of a subraster line m+1. A DIS-type saticon can have its beam deflected in such a manner as to produce a raster having 525 horizontal lines per field. When compared with the standef NTSC system, the number of pixels per line are doubled and the number of horizontal lines are doubled thus increasing the spatial resolution of the system by four times. If high-resolution signals derived from a high-resolution camera scanned as in FIG. 5b were to be transmitted to represent a picture utilizing the full resolution capability, and if that picture were transmitted at the rate of 30 frames per second as in standard NTSC, the required bandwidth would be four times the bandwidth required in the NTSC system, or $$4.2 \text{ MHz} \times 4 = 16.8 \text{ MHz}.$$

Clearly, it is not possible to transmit a 16.8 MHz luminance signal through a standard 6 MHz NTSC channel having about 4.2 MHz allocated to luminance. The additional bandwidth will have to be taken care of by either (1), including the additional information in those portions of the signal (e.g., the vertical blanking or horizontal blanking intervals) where little or no information is located or (2), providing an additional channel for broadcasting the high-resolution information.

In accordance with the present invention the high-resolution information as well as the standef information is transformed into a function which may be easily transmitted in either of the aforementioned formats. In general terms, any spatial or time varying amplitude function can be expressed as the sum of a series of basis functions with coefficients determined so that the series sums to the value of the original amplitude. Expressing a waveform in terms of orthogonal basis functions is known as a transform representation. The most familiar is the Fourier transformation into sine and cosine functions. Considerable literature has been devoted to the expression of video waveforms as Fourier transforms both along a single scanning line in one dimension and as a spatially varying function in two dimensions. Another less known, but equally valid, transform set is formed by Hadamard basis functions.

In other words, a portion of a television image may be characterized by the description of its amplitude along successive horizontal scans of the picture or by the coefficients of a series of basis functions evaluated so that the functions sum to the value of the original amplitude waveform. In accordance with the present invention it is deemed more expeditious to transmit the value of the coefficients of a Hadamard function rather than the value of the picture elements themselves.

Considering the single line n of NTSC video of FIG. 5b a string of pixels 506, 504, 508 in a high-definition television system is shown, each pixel is subdivided into four sub-pixels 510, 512, 514, 516. Any encoding scheme which is compatible with the high-definition television receiver to determine the values of the sub-pixels and, also permit the standef receiver to receive a standef signal. In the present instance the mean value of the four sub-pixels is transmitted for the standef receiver—the mean value being the value that the standard defination pixel would take in an NTSC receiver. Referring to FIG. 5c, it can be shown that the four picture elements 510, 512, 514, 516 formed in a rectangular array can be completely described by the four Hadamard functions referred to as $H_1$, $H_2$, $H_3$ and $H_4$. One result of describing the four picture elements is that the four coefficients of the Hadamard functions have unique physical significance. $H_1$, the sum of the four picture elements, is equal to the amplitude of a picture element in a standard definition display with one-fourth the resolution of a HDTV display. $H_2$ represents the finite difference equivalent of the derivative, or more accurately the gradient, of the function in the horizonal direction. Similarly, $H_3$ is the gradient in the vertical direction and $H_4$ is the gradient along the diagonals. It should be noted that in a uniform area of the display, $H_2$, $H_3$ and $H_4$ will be equal to zero. From this point on, the explanation of the invention in the embodiments that follow will be made with reference to a monochrome component (i.e., luminance signal) of a composite color representative signal.

Figure 6:
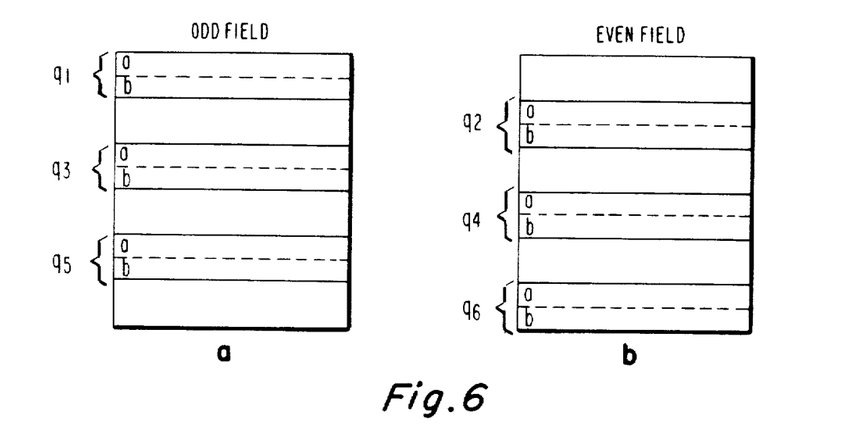
FIG. 6 illustrates the scanning pattern of a high-definition raster in accordance with one aspect of the invention.

FIG. 6 illustrates a portion of the image sampling raster of a high-definition television system compatible with a standard definition receiver in accordance with one aspect of the invention. Lines $q_1$, $q_3$, $q_5$ of FIG. 6a represent the odd lines of an NTSC system and lines $q_2$, $q_4$, $q_6$ of FIG. 6b the even lines. For the high-definition receiver each standard definition television line is broken down into "a" and "b" portions.

Figure 7:
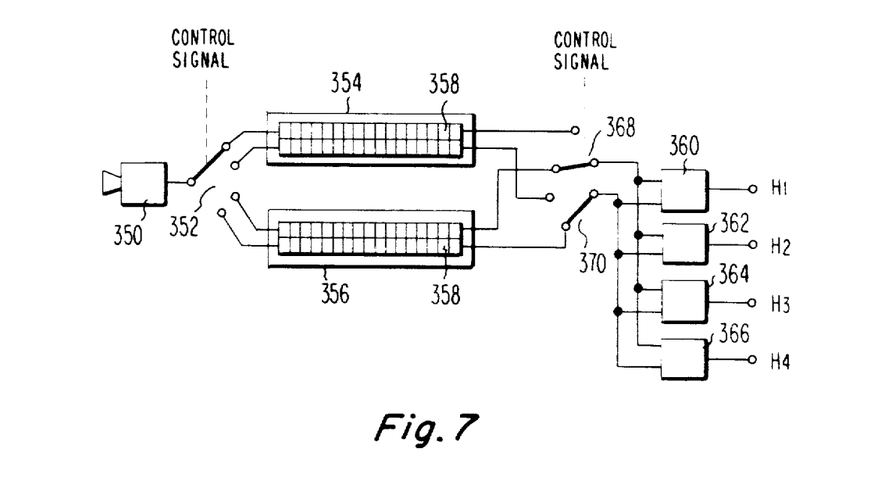
FIG. 7 illustrates, partially via block diagram form, a high-definition video encoder arranged in accordance with the invention.

Referring to FIG. 7, a high-definition color television generating system is shown. A high-definition luminance signal is generated by camera 350 scanning a 1050 line frame, 525 lines in each field, with a frame rate illustratively of 30 Hz. The resulting horizontal scan rate is two times the rate for standard-definition camera. The luminance signal is applied to switch 352 which sequentially switches the signal to clocked line-pair buffers 354, 356 having storage locations 358 for storing high-definition pixels of each horizontal line. When buffer 354 is filled, the two stored lines are clocked out via switches 368 and 370 in parallel to Hadamard encoders 360, 362, 364, 366. Hadamard encoders 360, 362, 364, 366 will be described in greater detail herein. The Hadamard encoders are filled after two clock pulses of line-pair buffer 354 and the Hadamard coefficients computed.

As will be described herein the transmitted signal is compatible with standard-definition receivers since the $H_1$ Hadamard coefficient is representative of a standard-definition pixel. While the Hadamard coefficients for the first line pair are being calculated the next pair of high-definition horizontal lines are clocked into line-pair buffer 356. After buffer 356 is filled, switches 368 and 370 connect it to the Hadamard encoders 360, 362, 364, 366. The process repeats to transmit a high-definition signal which is compatible with standard definition.

The scanning sequence like that shown in FIG. 6 can be used to generate a signal compatible with a standard NTSC signal; however, the HDTV interlacing may be objectionable since the system scans two lines then skips two lines. If the receiver contains a frame-store or similar device, the image could be stored and read out with an ordinary interlace or in a progressive fashion.

Figure 8:
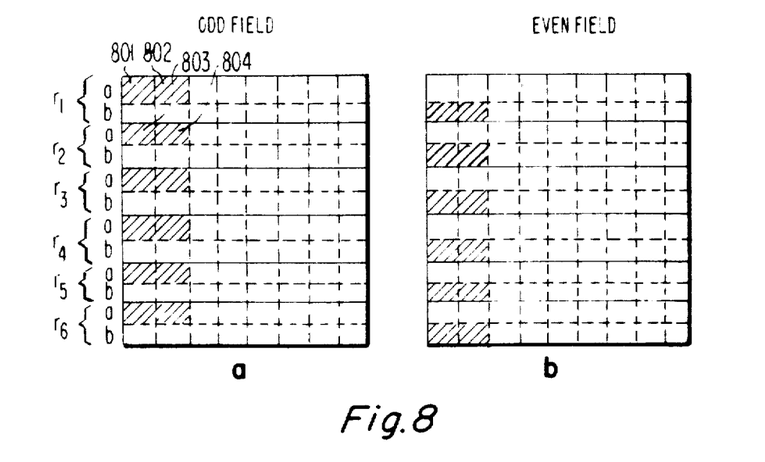
FIG. 8 shows another scanning pattern of a high-definition raster in accordance with one embodiment of the invention.

Referring to FIG. 8 a high-definition interlace is shown which does not require a frame store. In this arrangement the odd fields are formed by combining the high-definition pixels of row a of line $r_1$ with the high-definition pixels of row a of line $r_2$; row a of line $r_3$ and row a of line $r_4$; and so on. E.g., 801, 802, 803, 804 may be confined as a 2×2 Hadamard. In a similar manner the even fields are formed by combining the high-definition pixels of row b of line $r_1$ with the high-definition pixels of row b of line $r_2$; row b of line $r_3$ and row b of line $r_4$; and so forth. As described supra, the sub-pixels are taken in groups of four to compute the four Hadamard coefficients for each location. The difference is that the horizontal lines are separated by a single line rather than being formed in adjacent pairs. The lines are encoded and decoded in pairs and the high-definition is fully interlaced in a fashion more similar to standard definition interlace.

The disadvantage of the system of FIG. 8 is that there may be a slight loss of vertical resolution on a standard definition receiver. Since the $H_1$ Hadamard coefficient is now the average of four non-adjacent sub-pixels, it does not necessarily represent the best estimate of the luminance signal at the center of the four pixel group. This may result in a loss of vertical resolution, and a possibility of some aliasing artifacts. This degradation is probably not severe for most images.

FIG. 9 illustrates the image sampling raster of a high-definition television system configured for compatibility with a standard definition receiver which eliminates some of the problems discussed above. FIG. 9 a progressively scanned 525 line system is represented. In a progressively scanned system, each frame is comprised of two progressively scanned fields each utilizing the same 525-line raster pattern. Sub-raster scan lines $P_1$ and $P_2$, $P_3$ and $P_4$, $P_5$ and $P_6$ taken as pairs correspond to the standard definition raster of the odd fields and sub-raster scan lines $P_2$ and $P_3$, $P_4$ and $P_5$, $P_6$ and $P_7$ taken as pairs correspond to the standard definition raster of even fields.

Figure 9A:
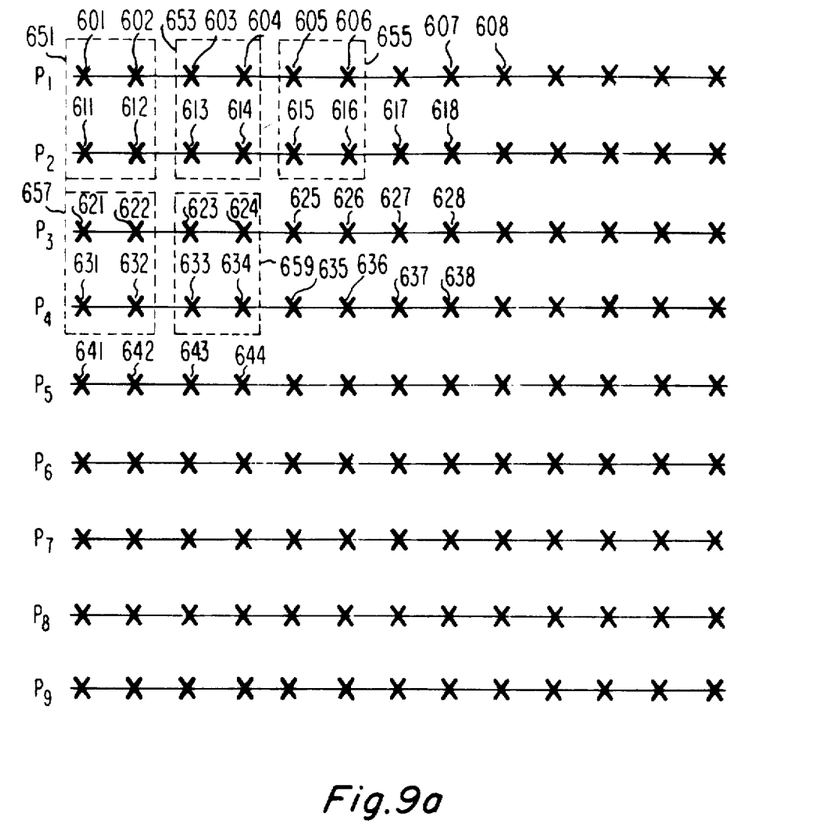
FIGS. 9a and 9b illustrate in detail the nature of the scanning pattern in accordance with one aspect of the invention.
Figure 9B:
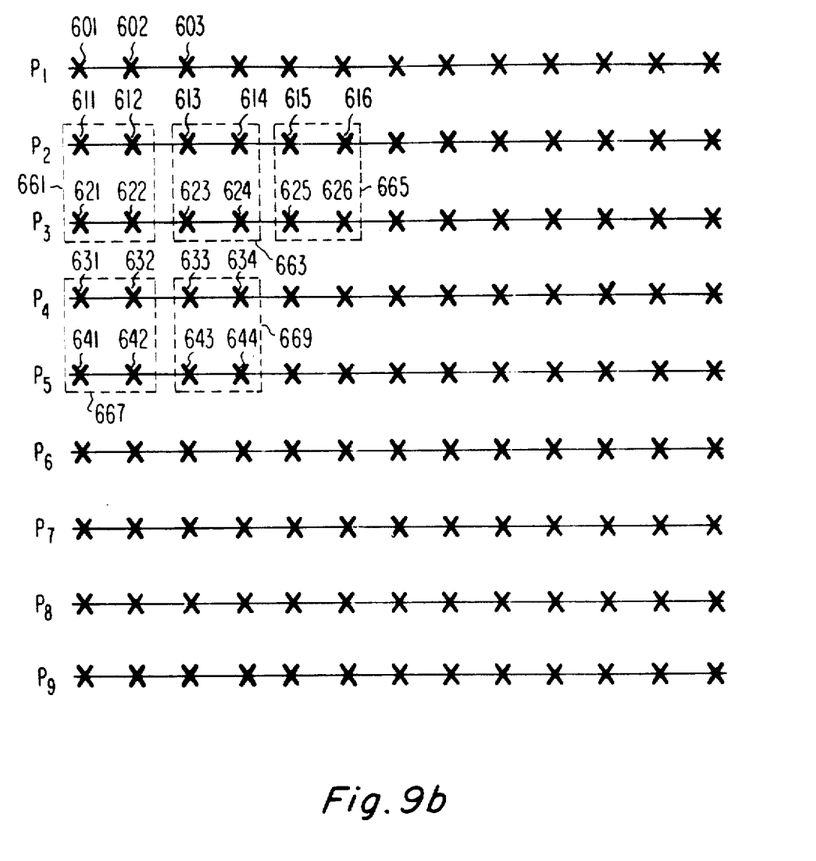

FIG. 9a illustrates a high-definition television raster for an odd field scanned in accordance with the principles of the present invention wherein a 525 horizontal line display is scanned progressively and rectangular pixels are transformed into their Hadamard coefficients. Each of the blocks 651, 653, 655, 657 and 659 represents a rectangular array of samples which are selected from adjacent lines in an odd field. Referring to FIG. 9b, scanning of an even field is represented. Each of the blocks 661, 663, 665, 667 and 669 represents the 2×2 array of Hadamard samples which are chosen for transmission in the even field sequence.

Figure 10:
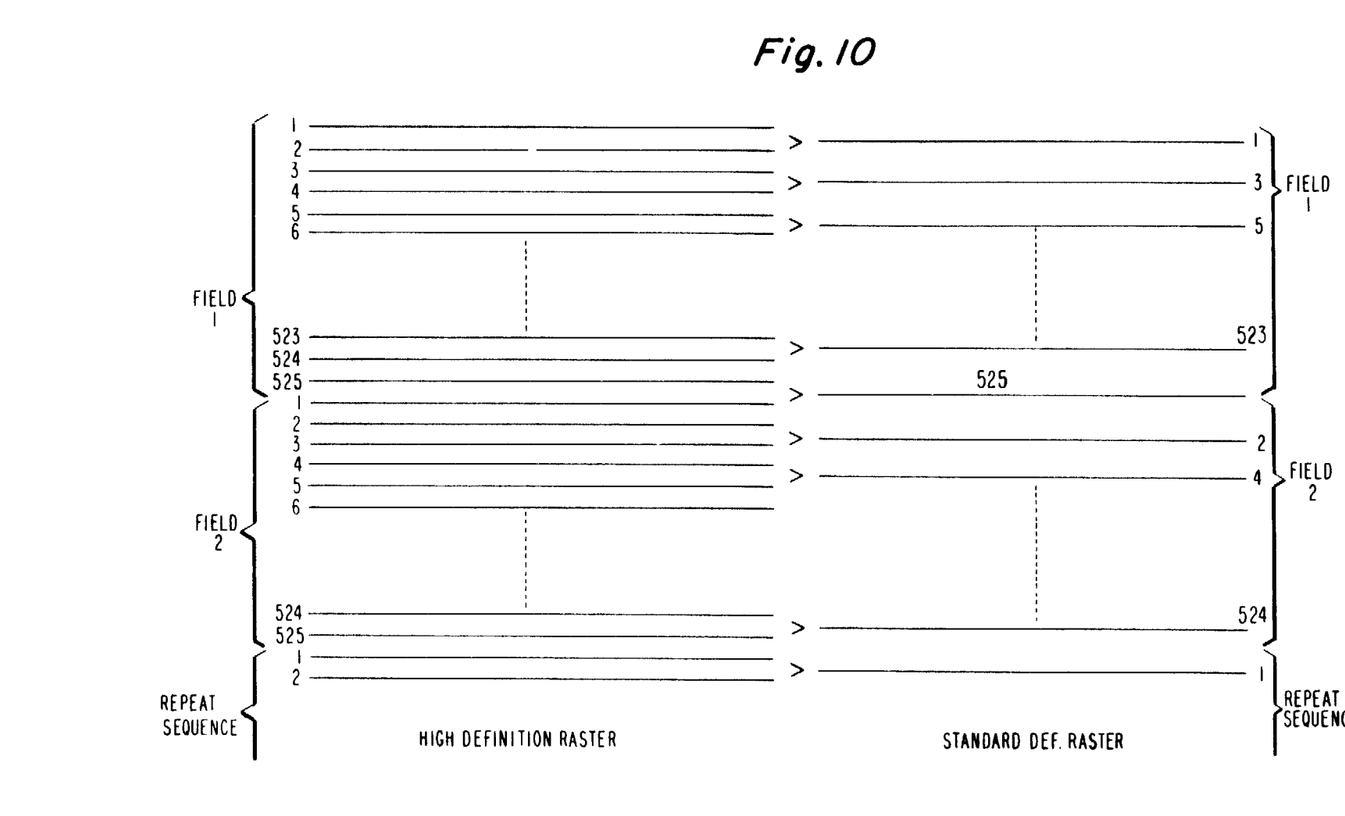
FIG. 10 illustrates the scanning pattern as viewed on a display in accordance with one aspect of the principles of the present invention.

Referring to FIG. 10, the correspondence between a high-definition progressively-scanned 525 horizontal line system and a standard-definition television system is provided. In every field of a HDTV raster 525 lines are scanned progressively. In odd fields, shown on the left in FIG. 10 lines 1 and 2 of field 1 of the high-definition television display are averaged to form line 1 of the standef raster, lines 3 and 4 form line 3, lines 5 and 6 form line 5, etc. As the high-definition lines of the even fields, depicted as field 2, are scanned, lines 2 and 3 form line 2 of the standef raster, lines 4 and 5 form line 4, etc. It should be noted that a 525 line progressively scanned HDTV raster will produce an interleaved standef raster compatible with standef receivers. In the transition between fields 1 and 2 of the HDTV system line 525 of field 1 is combined with line 1 of field 2 to produce the half-line at the end of field 1 of a standef system and a half-line at the beginning of field 2. This information which is the combination of the bottom of one raster with the top of the next raster will be blanked by the standard vertical blanking process. The luminance signal generated by this technique is compatible with, and almost identical to, that scanned by standef NTSC systems in an interlaced scan. One advantage of this system is that it will not have the flickering moire' characteristic of a conventional television pick-up. The progressive scan has adequate sampling frequency in the vertical direction to eliminate most of the moire'. The lower resolution line information is produced with a vertical low pass filter which will eliminate the classical moire' pattern. Averaging two lines together provides a system which eliminates the flickering moire' pattern without the use of a frame store or similar storage device.

Figure 11:
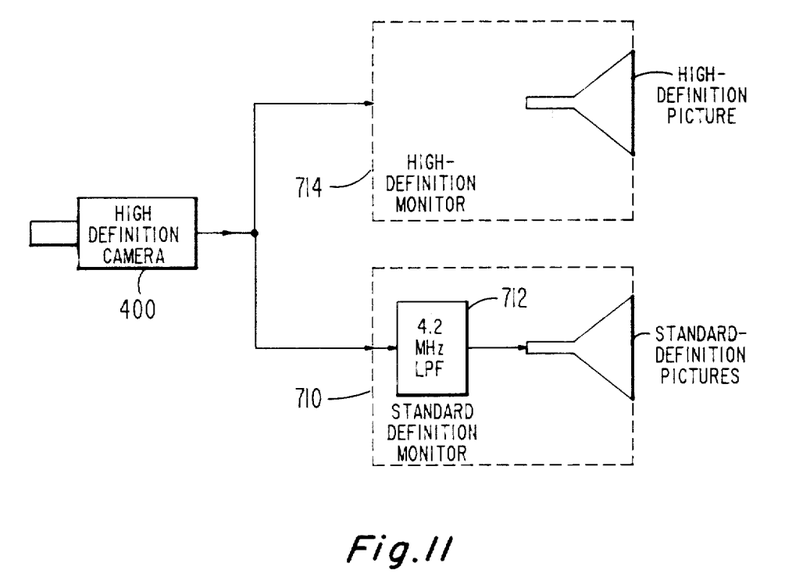
FIG. 11 is a symbolic block diagram of a compatible television system according to the invention.

FIG. 11 symbolically represents a compatible high-definition television system. A signal produced by high-definition camera 400 is the source of a signal for a standard-definition monitor 710 which is limited to a bandwidth of 4.2 MHz by a symbolic low pass filter (LPF) 712 to produce a standard-definition picture. A high-definition monitor 714 not so limited in bandwidth and properly arranged to decode the signal is used to produce a high-definition picture.

Figure 12:
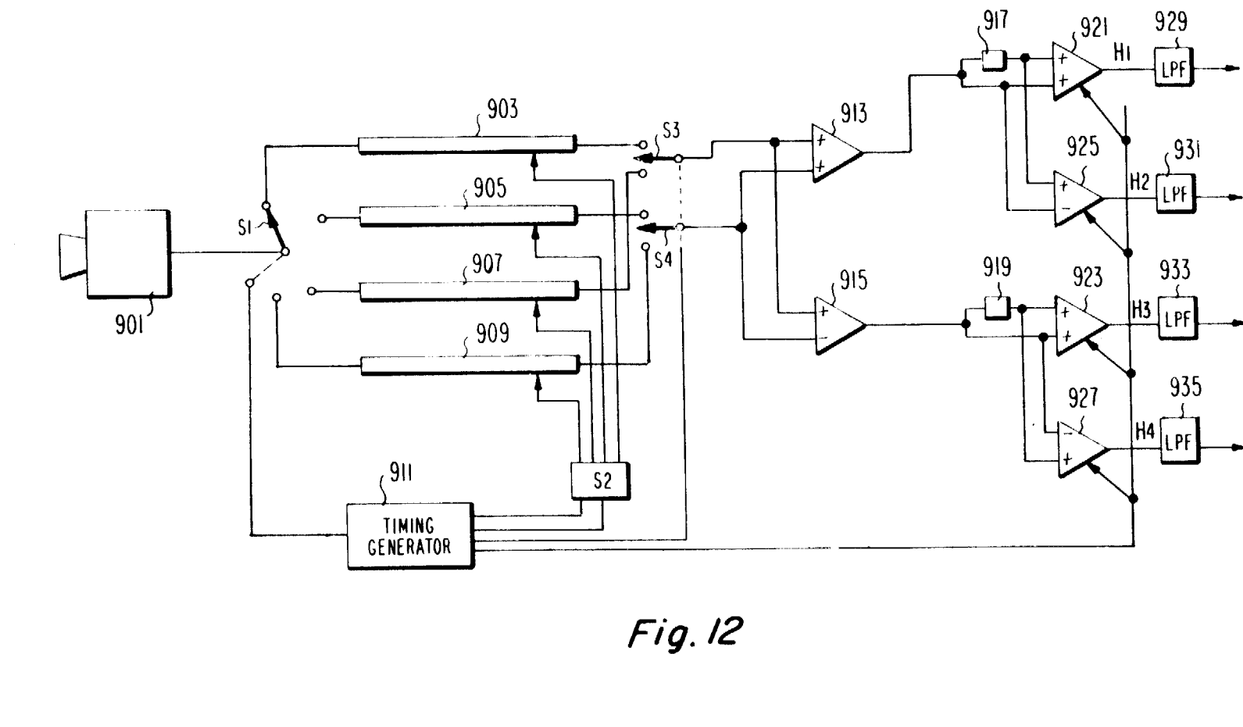
FIG. 12 illustrates, partially via block diagram form, salient portions of a high-definition video encoder arranged in accordance with the invention.

FIG. 12 illustrates, partially in simplified block diagram form, a high-definition color television generating system that provides a television signal wherein the horizontal scanning is performed in a linear manner utilizing four single line stores to effect the scanning. A high-resolution luminance signal is generated by camera 901 scanning 525 lines progressively in each field. The field rate is 60 Hz. The resulting horizontal scan rate is two times the horizontal scan rate for a standard-definition receiver (i.e., approximately 31 KHz). This luminance signal is applied to commutating switch S1. S1 connects the luminance signal from camera 901 sequentially to clocked delay lines 903, 905, 907, 909. Each clocked delay line 903–909 is clocked at a rate such that it is filled during one horizontal scan of camera 901. The clock frequency, for example, could be $16f_{sc}$, i.e., 16 times the color subcarrier frequency, resulting in approximately 1,800 picture elements clocked into a delay line during a horizontal scan interval. The $16f_{sc}$ rate represents a $4f_{sc}$ standard definition sample rate doubled for the line rate and doubled again to increase the resolution by two. Timing generator 911 provides signals to switch S1 such that alternate horizontal lines are clocked into alternate delay lines. After delay lines 903 and 905 are filled, switch S2, also controlled by timing generator 911, clocks out both delay lines 903, 905 at half of the rate at which the information is clocked in, for example, $8f_{sc}$, such that both lines 903 and 905 are clocked out at a rate which is commensurate with standard television, approximately 15.5 KHz.

As camera 901 is scanned, switch S1 in turn clocks subsequent lines into delay lines 907 and 909. Referring back to FIG. 9, the signal clocked into and out of delay line 903 in field 1 will be pixels 601, 602, 603, 604, etc. of horizontal line $P_1$; of delay line 905, pixels 611, 612, 613, 614, etc.; of line $P_2$ delay line 907, pixels 621, 622, 623, 624, etc. of line $P_3$; and delay line 909, pixels 631, 632, 633, 634, etc. of line $P_4$. The signal streams clocked out of delay lines 903, 905, 907, 909 are applied to two operational amplifiers 913 and 915 via switches S3 and S4 which recive their timing information from timing generator 911. Operation amplifier 913 sums the signals of adjacent lines. At one clock interval line 903 is outputting signal information from pixel 601 and line 905 is outputting signal information from pixel 611. At the next clock cycle delay line 903 will be outputting signal from pixel 602 and delay line 905 will be outputting the signal for pixel 612. Therefore, the output of amplifier 913 is a sequence of 601+611 followed by 602+612, 603+613, 604+614, and so forth. Operational amplifier 915 functions identically, except that the information from line 905 is connected to an inverse input terminal so that the output stream is a difference signal, i.e., 601-611, 602-612 and 603-613, 604-614 and so on. The outputs from amplifiers 913 and 915 are applied to one clock cycle delay elements 917, 919, so that the information from adjacent pixel pairs, i.e., the signal for pixels 601+611 and the signal for pixels 602+612 is coincident simultaneously at op-amps 921 and 925. Likewise, the output of amplifier 915 is applied to a delay network in a way that the 601-602 signal and the 611-612 signal are brought into time coincidence at op-amps 923 and 927. The output of the direct and delayed signal are added in amplifiers 921 and 923 and substracted in amplifiers 925 and 927. Operational amplifiers 921, 923, 925, 927 must be gated in order to transmit a value only at the times that all four values appear at the input of the operational amplifier. Thus, the four coefficients of the Hadamard functions are time quantized with the incoming data. The timing generator 911 provides gating signals to op-amps 921, 923, 925, 927. The output of amplifier 921 is the $H_1$ coefficient; amplifier 925 is $H_2$; 923, $H_3$; and 927, $H_4$. Before transmission it is necessary to smooth the four functions with low pass filters 929, 931, 933, 935. If there were no low pass filtering the gating signal would result in the transmission of spurious harmonics of the desired signal. The filtered signal may be transmitted as an analog high-definition television signal in accordance with the aforementioned Hurst patent, wherein the high-definition information is transmitted in the horizontal or vertical blanking interval. Advantageously, this transmitted signal is compatible with standard-definition receivers since the $H_1$ Hadamard coefficient is representative of a standard-definition pixel.

An additional feature of this arrangement may be appreciated by referring back to FIG. 10. Line 1 of the scan is stored in delay line 903, line 2 in 905, and so forth. It can be shown that the line number being stored in 903 is equal to $4N+1$, where N is a counting integer. As the end of the scan is approached, line 521 will be stored in line 903, 522 in line 905, 523 in line 907, and 524 in line 909. The last line of the high-resolution camera scan line 525 will be stored in line 903. The first line in the next scan will be stored in line 905. As a result of this scan progression, the average is taken between lines 1 and 2; the lines 3 and 4 in the first output frame and averages between lines 2 and 3; lines 4 and 5; etc., in the second output frame. Thus in accordance with the present system, alternate fields of the standef raster will be interleaved.

Figure 13:
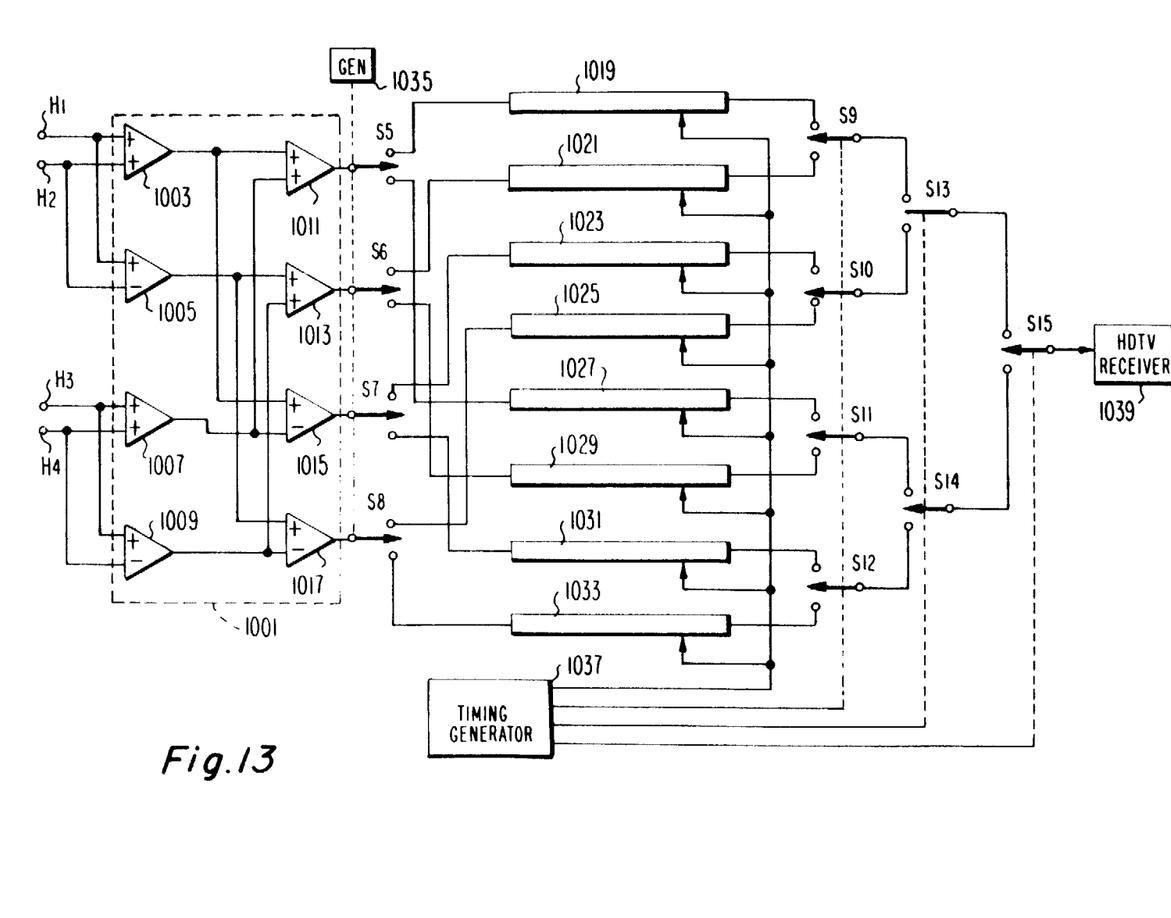
FIG. 13 illustrates, partially in block diatram form, a high-definition television receiver using line stores, in accordance with the principles of the present invention.

Operation of the high-resolution receiver will be described with reference to FIG. 13. The signals $H_1$, $H_2$, $H_3$ and $H_4$ are input to a matrix of operational amplifiers 1001. The $H_1$ signal is simultaneously applied to one input of summer 1003 and the non-inverting input of op-amp 1005. The $H_2$ signal is applied to one input of summing amplifier 1003 and to the inverting input of amplifier 1005. The $H_3$ signal is simultaneously applied to one of the inputs of summing amplifier 1007 and to the non-inverting input of op-amp 1009. Simultaneously, the $H_4$ signal is applied to one input of op-amp 1007 and to the inverting input of op-amp 1009. The outputs of op-amp 1003 and 1007 are summed in op-amp 1011 to provide the high-definition pixel in the upper lefthand corner of the standard definition pixel, for example, pixels 601, 603, 605, etc. Referring to FIG. 5c, $H_1+H_2+H_3+H_4$ is equal to four times sub-pixel 510.

The outputs of op-amp 1005 and 1009 are summed in op-amp 1013 to provide the high-definition pixels in the upper righthand corner of the standard definition blocks, for example, pixels 602, 604, 606, etc. Referring to FIGS. 5c, $H_1-H_2+H_3-H_4$ is equal to four times sub-pixel 512. The output from op-amp 1007 is subtracted from the output of 1003 in operational amplifier 1015 to provide the high-definition pixel in the lower lefthand corner of the standard-definition block, for example, pixels 611, 613, 615, etc. Referring again to FIG. 5c, $H_1+H_2-H_3-H_4$ is equal to four-times sub-pixel 514. Further, the output from op-amp 1009 is subtracted from the output of 1005 in operational amplifier 1015 to provide the high-definition pixels in the lower righthand corner of the standard-definition block, for example, pixels 612, 614, 616, etc. Referring to FIG. 5c. $H_1-H_2-H_3+H_4$ is equal to four-times sub-pixel 516. It should be noted that provisions may be made for a scaling function at the receiver so that the exact sub-pixel values are obtained when the Hadamard functions are combining. The values at the output of matrix 1001 exist during the entire interval of a low resolution picture element. For example, they would exist for approximately 70 nanoseconds which is equivalent to a picture element rate of $4f_{sc}$. In order to decode these signals, it is necessary to have two sets of four delay lines, i.e., set number 1 consisting of delay lines 1019, 1021, 1023 and 1025 and the other set consisting of 1027, 1029, 1031 and 1033. The signals from matrix 1001 are switched at the horizontal scan rate, 15.5 KHz, via switches S5, S6, S7 and S8 controlled by generator 1035, from the upper delay lines 1019, 1021, 1023 and 1025 to the lower delay lines 1027, 1029, 1031 and 1033. The signals are clocked in at the $4f_{sc}$ rate. In operation, switches S5, S6, S7 and S8 are initially positioned in the up position to fill delay lines 1019, 1021, 1023 and 1025 and then switched to the lower group 1027, 1029, 1031 and 1033 when the upper group has been filled. The switches continue to alternate the input lines between the two groups of four delay lines. When the upper delay line group is full, line 1019 and 1021 are clocked out at twice the loading rate or at $8f_{sc}$. Switch S9 controlled by timing generator 1037 alternates between delay line 1019 and 1021 which are clocked out by timing generator 1037 at $16f_{sc}$ rate to sample first pixels from the upper lefthand corner of the standard-definition group and then pixels from the upper righthand corner of the standard-definition group, for example, 601, 602, 603, 604, etc. to generate a stream that is constructed in the form of the original signal from the original scan. Switches S13 and S15 are positioned to pass the signals from the delay lines 1019, 1021 to the high-definition television receiver. On the next horizontal scan switch S10 is switched and the signals are clocked out of delay lines 1023 and 1025 via switches S13 and S15 to form line $P_2$ of the high-definition television receiver scan line. For the next scan line, which is line $P_3$ switch S11 clocks the signals out of delay line 1027 and 1029 via switches S14 and S15 to the high-definition receiver 1039 and then for the next line of high-definition information, i.e., line $P_4$, switch S12 clocks the information from delay lines 1031 and 1033 via switches S14 and S15 to the high-definition receiver. While the information is being clocked out of one set of delay lines the input switches are changed so that the new information is clocked into the new set of delay lines so that the new information is stored for the next scan.

Hadamard encoding allows the possibility of reducing the bandwidth to below four times NTSC that would normally be required in an HDTV system. As discussed above, the high-definition difference information contained in the coefficients $H_2$ through $H_4$ may be transmitted in the scheme as described in the Hurst application. However, this does not optimally solve the bandwidth problem. One of the features of the Hadamard encoding is that since adjacent sub-pixels are highly correlated, most of the entropy is in the $H_1$ coefficient, with relatively little in the $H_2$, $H_3$ and $H_4$ coefficients. Discarding the $H_4$ coefficients may have little apparent effect on the image quality. There are several reasons for this. First, $H_4$ contains the highest spatial frequencies which tend to have low entropy and tend not to be strongly visible to the eye of a viewer. Second, $H_4$ contains diagonal energy, which tends to be less visible to a viewer and less common in normal television scenes. If the $H_4$ coefficient is discarded and $H_2$ and $H_3$ are encoded digitally their reduced entropy may be taken advantage of. For example, variable length coding could be used. Additionally, since the eye is relatively insensitive to contrast errors in these coefficients they may be quantitized on a coarse scale, e.g., but rates on the order of 2 bits/pixel.

Figure 14:
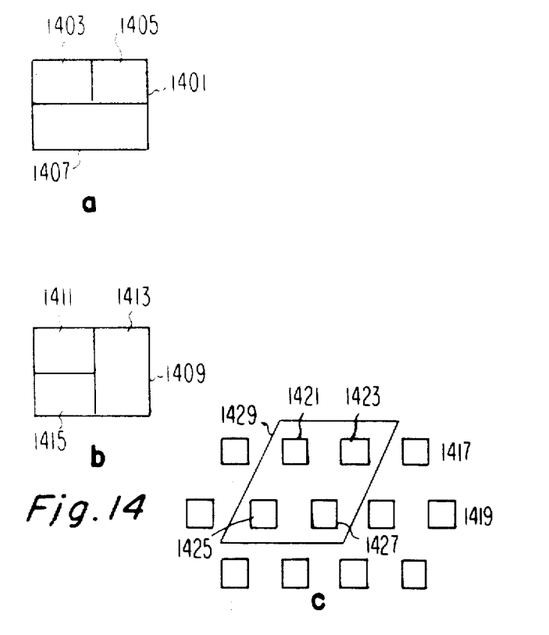
FIG. 14 shows another pattern of high definition pixels which may be encoded in accordance with further aspects of the present invention.

Referring to FIG. 14 other embodiments of pixel arrangements are shown. FIGS. 14a and 14b illustrate three high definition pixels included in one standef pixel. In FIG. 14a the standard definition pixel 1401 includes three high-definition sub-pixels 1403, 1405, 1407 which may be encoded in a Hadamard scheme. The $H_1$ coefficient would include the sum of 1403, 1405 and 1407; $H_2$ would include the difference between 1403 and 1405; and $H_3$ would include the difference between 1407 and the sum of 1403 and 1405. In FIG. 14b the standef pixel 1409 includes three high-definition subpixels 1411, 1413 and 1415. In the FIG. 14b arrangement $H_1$ would include the sum of 1411, 1413 and 1415; and $H_2$ would include the difference between 1409 and the sum of 1411 and 1415; and $H_3$ would include the difference between 1411 and 1415. Such an arrangement may provide an attractive way of reducing the bandwidth of the high-definition Hadamard system.

In FIG. 14c another arrangement of pixels is shown in which the pixels are arranged in a polygonal fashion. According to FIG. 14c the pixels of adjacent lines 1417 and 1419 of a high definition raster are staggered to form a dot interlace pattern. A group of four high-definition pixels 1421, 1423, 1425, 1427 arranged in a polygonal fashion (e.g., in the form of a parallelogram) form standard definition pixel 1429. As described herein the Hadamrd basis functions are formed by the sums and differences of the four high definition pixels within the standard definition pixel. The $H_1$ coefficient is the sum of 1421, 1423, 1425 and 1427. The $H_2$ coefficient is the difference between the sum of 1421 and 1425 and the sum of 1423 and 1427; $H_3$ is the difference between the sum of 1421 and 1423 and the sum of 1425 and 1427; and $H_4$ is the difference between the sum of 1421 and 1427 and the sum of 1423 and 1425.

Another scheme for data rate reduction for Hadamard coefficients may be in accordance with U.S. Pat. No. 4,323,916 filed in the name of R. A. Dischert et al. In accordance with this scheme the bandwidth of a digital television signal is reduced by sending steering bits that are transmitted to tell which of the transmitted information is the closest match to the untransmitted information so that pixels represented by the latter may be reconstructed.

Other embodiments of the invention will be apparent to those skilled in the art. It will be obvious that digital equivalents of the functions described in analog terms may be used. It should also be obvious that scan signal sources such as film scanners may be used instead of television cameras.

What is claimed is:

1. A high-definition television system for generating a high-definition television signal compatible with a standard-definition television receiver arranged to normally process a lower-definition television signal conforming to a given broadcast standard having a limited-bandwidth, said system comprising:
   scanning means for scanning an image to provide a high definition image signal, the effective line scan rate of said image signal being greater than the line rate of said given broadcast standard;
   quantizing means for time quantizing samples of said image signal to provide a sampled signal having a given sample rate;
   Hadamard means responsive to said sampled signal for transforming at least three of said time quantized samples formed in a polygonal fashion into a plurality of coefficients representative of the coefficients of Hadamard basis functions, one of said plurality of coefficients being the sum of said samples formed in said polygonal fashion; and wherein said effective line rate of said scanning means and said given sample rate of said quantizing means are each selected with respect to said given broadcast standard such that said one of said plurality of coefficients of said Hadamard basis function corresponds to a picture element in said given broadcast standard; and
   means for limiting the bandwidth of said one of said plurality of coefficients provided by said Hadamard means to said bandwidth of said given broadcast standard to thereby provide said high-definition television signal having an effective line rate and bandwidth compatible with said standard-definition television receiver.

2. The system according to claim 1 wherein said polygonal fashion is a rectangular array.

3. The system according to claim 2 wherein said time quantized samples comprise a two-by-two matrix of high-definition picture elements.

4. The system according to claim 3 wherein said plurality of coefficients is equal to the four Hadamard basis functions of a two-by-two matrix.

5. The system according to claim 4 wherein said one of said coefficients is the all positive sum of the samples in said two-by-two matrix.

6. The system according to claim 1 wherein said at least three of said time quantized samples are adjacent time quantized samples.

7. The system according to claim 6 wherein said adjacent-time quantized samples are four samples arranged in a rectangular array.

8. In a high-definition television system for generating a high-definition television signal compatible with a standard-definition television receiver arranged to normally process a lower-definition television signal conforming to a given broadcast standard having a limited bandwidth, a transmitter comprising:
   scanning means for scanning an image of a camera to provide a high-definition image signal, the effective line scan rate of said image signal being greater than the line rate of said given broadcast standard;

quantizing means for time quantizing samples of said image signal to provide a sampled signal having a given sample rate;

Hadamard means responsive to said sampled signal for transforming at least three of said time quantized samples formed in a polygonal fashion into a plurality of coefficients representative of the coefficients of Hadamard basis functions;

said effective line scan rate of said scanning means and said given sample rate of said quantizing means being each selected with respect to said given broadcast standard such that one of said plurality of coefficients of said Hadamard basis function corresponds to a picture element in said given broadcast standard;

means for low pass filtering said plurality of coefficients; and transmitting means for transmitting a signal including said one of said plurality of coefficients which is the sum of said samples formed in said polygonal fashion representing a picture element for display on said standard definition receiver, said signal including additional Hadamard basis coefficients for display on a high-definition television receiver.

9. The transmitter according to claim 8 wherein said polygonal fashion is a parallelogrammatic array.

10. The transmitter according to claim 9 wherein said time quantized samples comprise a two-by-two matrix of high-definition picture elements.

11. The transmitter according to claim 10 wherein said plurality of coefficients is equal to the four Hadamard basis functions of a two-by-two matrix.

12. The transmitter according to claim 11 wherein said one of said coefficients is the all positive sum of the samples in said two-by-two matrix.

13. A high-definition television system capable of processing a high-definition television signal comprised of Hadamard encoded components, one of said components being compatible in terms of effective line rate and bandwidth with a standard-definition television receiver of a type for normally processing a lower-definition television signal conforming to a given broadcast standard having a limited bandwidth, comprising:

scanning means for scanning an image onto a display;

quantizing means for time quantizing said high-definition television signal into time-quantized first samples corresponding to said Hadamard encoded components;

Hadamard decoding means coupled to said quantizing means for transforming said first samples into at least three second samples formed in a polygonal fashion representative of picture elements of a high-definition image, one of said first samples being representative of a picture element of said standard-definition television receiver;

signal processing means coupled to said Hadamard means for processing said at least three of said second samples for display by said scanning means at an effective line scan rate equal to a multiple of the line rate of said given broadcast standard.

14. The system according to claim 13 wherein said polygonal fashion is a parallelogrammatic array.

15. The system according to claim 14 wherein said second samples comprise a two-by-two matrix of high-definition picture elements.

16. The system according to claim 15 wherein said first samples comprise the four Hadamard basis functions for a two-by-two matrix.

17. The system according to claim 13 wherein said one of said first samples comprises the sum of the samples in a two-by-two matrix.

18. The system according to claim 17 wherein said one of said first samples comprises the all positive sum of said samples.

19. A high-definition television system compatible with receivers normally processing standard-definition signals conforming to a given broadcast standard, comprising:

a video signal source for providing a high definition video signal having an effective line scan rate greater than that of said given broadcast standard;

sampling means for sampling said video signal at a predetermined rate to provide a sampled video signal;

Hadamard encoding means responsive to said sampled signal for providing a transformed signal representative of the sum of at least three contiguous samples in a block of said samples of said sampled video signals;

transmission means for transmitting said transformed signal via a standard braodcast television transmitter; and wherein said effective line scan rate of said high-definition video signal and said predetermined sampling rate of said sampling means and the bandwidth of said transmission means are all selected such that said transmitted transformed signal corresponds to the line rate, resolution and bandwidth of said given broadcasting standard.

* * * * *